(12) United States Patent
Miyazaki

(10) Patent No.: US 11,092,213 B2
(45) Date of Patent: Aug. 17, 2021

(54) GEAR MECHANISM, GEAR ADJUSTMENT METHOD AND ROBOT

(71) Applicant: FANUC CORPORATION, Yamanashi (JP)

(72) Inventor: Genki Miyazaki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 157 days.

(21) Appl. No.: 16/686,518

(22) Filed: Nov. 18, 2019

(65) Prior Publication Data

US 2020/0208715 A1 Jul. 2, 2020

(30) Foreign Application Priority Data

Dec. 27, 2018 (JP) .............................. JP2018-244772

(51) Int. Cl.

| F16H 1/20 | (2006.01) |
|---|---|
| F16H 1/22 | (2006.01) |
| B25J 9/10 | (2006.01) |
| F16H 48/10 | (2012.01) |
| F16H 37/06 | (2006.01) |
| B25J 17/02 | (2006.01) |

(52) U.S. Cl.
CPC .............. F16H 1/22 (2013.01); B25J 9/102 (2013.01); B25J 17/0258 (2013.01); F16H 37/065 (2013.01); F16H 48/10 (2013.01)

(58) Field of Classification Search
CPC . F16H 1/20; F16H 1/22; F16H 37/065; F16H 48/10; F16H 55/18; F16H 57/12; B25J 9/102

USPC ................................. 74/409, 665 N; 901/25
See application file for complete search history.

(56) References Cited

U.S. PATENT DOCUMENTS

| 3,811,335 A | * | 5/1974 | Hunsberger | ............ F16H 55/24 74/409 |
|---|---|---|---|---|
| 3,888,134 A | * | 6/1975 | Miranda | ............... F16H 57/023 74/405 |
| 4,488,447 A | * | 12/1984 | Gebhardt | ............... B65H 19/30 74/15.63 |
| 5,960,671 A | * | 10/1999 | Nguyen | .................. F16H 3/001 74/325 |

(Continued)

FOREIGN PATENT DOCUMENTS

| JP | S59-226733 A | 12/1984 |
|---|---|---|
| JP | S63-123685 A | 5/1988 |

(Continued)

*Primary Examiner* — William C Joyce
(74) *Attorney, Agent, or Firm* — Maier & Maier, PLLC

(57) ABSTRACT

A gear mechanism including: a pair of housings that are combined in a positioned state by mating a cylindrical inner surface and a cylindrical outer surface centered on a first axis with each other; two first gears that are attached to one housing so as to be rotatable about the first axis and a second axis parallel to the first axis; and two second gears that are rotatably attached to the other housing, and that are respectively engaged with the two first gears in a state in which the pair of housings are combined. The first gear that is attached so as to be rotatable about the second axis and the second gear that is engaged with the first gear are arranged at positions where an inter-axial distance therebetween is changed by means of a relative rotation of the housings about the first axis.

8 Claims, 7 Drawing Sheets

(56) References Cited

U.S. PATENT DOCUMENTS 6,155,376 A * 12/2000 Cheng .................. B62D 5/0421
                                                           180/444

FOREIGN PATENT DOCUMENTS

| | | |
|---|---|---|
| JP | H09-089052 A | 3/1997 |
| WO | 2014/147734 A1 | 9/2014 |

* cited by examiner

GEAR MECHANISM, GEAR ADJUSTMENT METHOD AND ROBOT

CROSS-REFERENCE TO RELATED APPLICATIONS

This application is based on Japanese Patent Application No. 2018-244772, the contents of which are incorporated herein by reference.

FIELD

The present invention relates to a gear mechanism, a gear adjustment method and a robot.

BACKGROUND ART

There is a known wrist structure for an industrial robot, said wrist structure having a compact and lightweight construction in which two motors are provided in a single casing so as to be parallel to each other, and in which spur gears are employed, making it possible to assemble each component from one direction, thus facilitating adjustment work and improving efficiency in the assembly work, at low cost (for example, see Japanese Unexamined Patent Application, Publication No. Sho 63-123685).

SUMMARY

An aspect of the present invention is a gear mechanism including: a pair of housings that are combined in a positioned state by mating a cylindrical inner surface and a cylindrical outer surface centered on a first axis with each other; two first gears that are attached to one of the housings so as to be rotatable about the first axis and a second axis parallel to the first axis; and two second gears that are rotatably attached to the other housing, and that are respectively engaged with the two first gears in a state in which the pair of housings are combined, wherein the first gear that is attached so as to be rotatable about the second axis and the second gear that is engaged with said first gear are arranged at positions where an inter-axial distance therebetween is changed by means of a relative rotation of the housings about the first axis.

DETAILED DESCRIPTION

A gear mechanism 1, a gear adjustment method and a robot according to an embodiment of the present invention will be described below with reference to the drawings.

Figure 1:
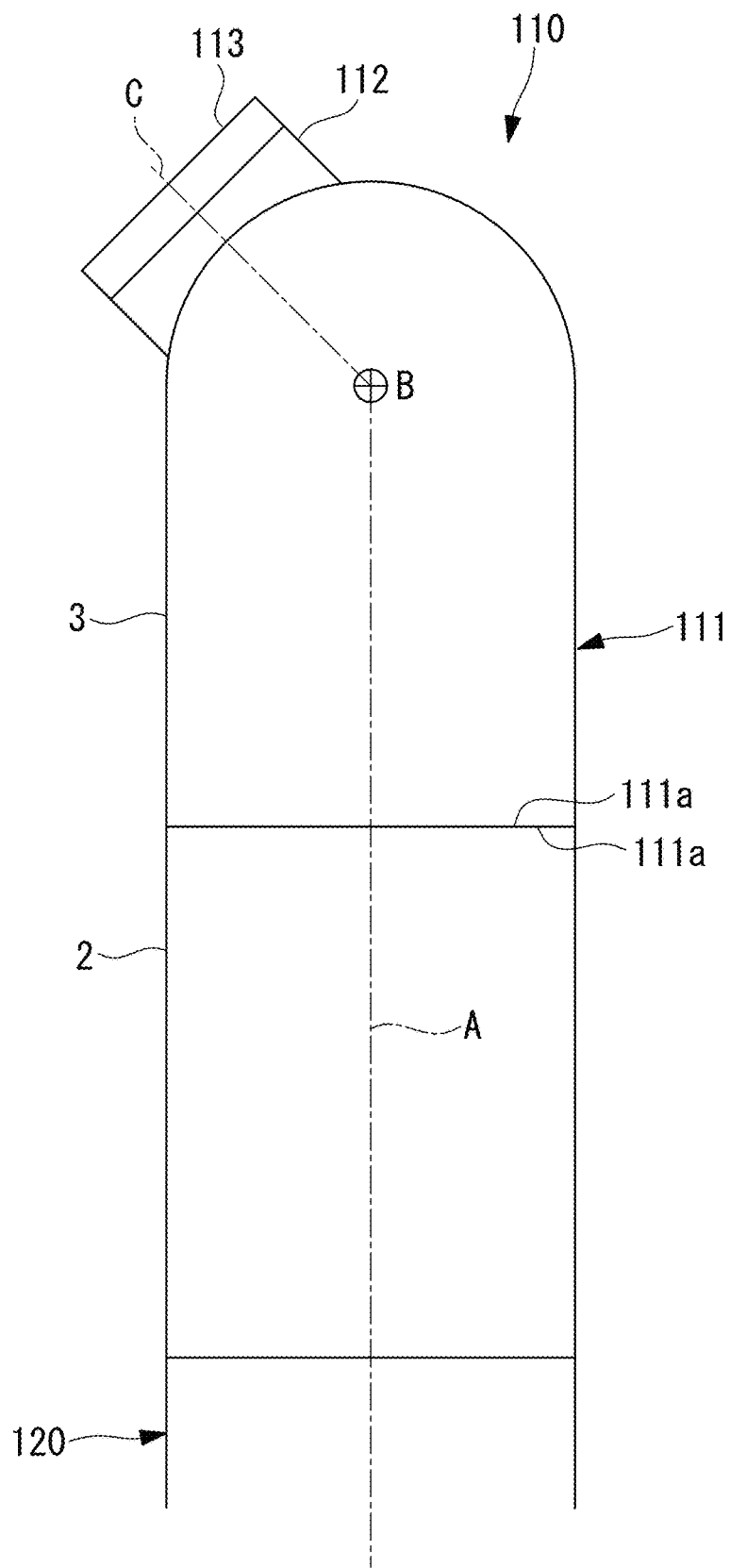
FIG. 1 is a partial longitudinal sectional view showing a wrist unit of a robot according to an embodiment of the present invention.

The robot according to this embodiment is, for example, an upright articulated robot and is provided with a wrist unit 110, as shown in FIG. 1.

The wrist unit 110 includes: a first wrist element 111 that is rotatable about a first wrist axis A with respect to an arm 120; a second wrist element 112 that is rotatable, at the distal end of the first wrist element 111, about a second wrist axis B orthogonal to the first wrist axis A; and a third wrist element 113 that is rotatable about a third wrist axis C orthogonal to the second wrist axis B and passing through the intersection of the first wrist axis A and the second wrist axis B.

The first wrist element 111 includes a first housing (housing) 2 on the base end side and a second housing (housing) 3 on the distal end side, said housings being combined so as to be separable at joining surfaces 111a orthogonal to the first wrist axis A, and being fixed to each other by fastening with bolts (not shown).

The first housing 2 has two motors (not shown) built therein, for driving the second wrist element 112 and the third wrist element 113.

Figure 2:
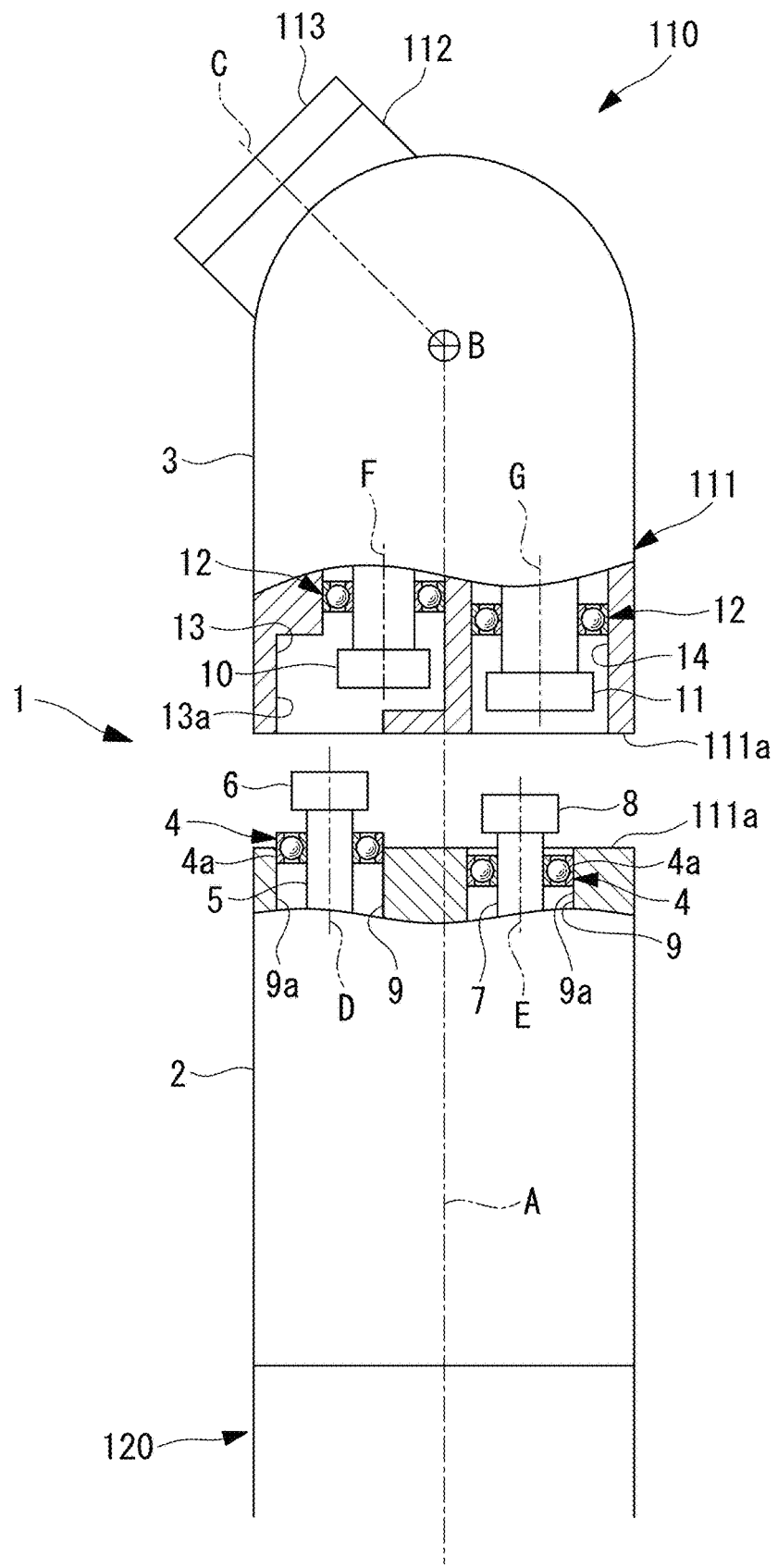
FIG. 2 is a partial longitudinal sectional view showing a state in which a gear mechanism according to this embodiment, which is provided in the wrist unit in FIG. 1, is separated into two components.

As shown in FIG. 2, one of the motors has, in the first housing 2, a shaft 5 that is supported by a bearing (annular member) 4 so as to be rotatable about a first axis D. A first drive gear (first gear) 6 composed of a spur gear is provided at the distal end of the shaft 5.

As shown in FIG. 2, the other motor also has, in the first housing 2, a shaft 7 that is supported by a bearing 4 so as to be rotatable about a second axis E, which is disposed parallel to the first axis D with a space therebetween. A second drive gear (first gear) 8 composed of a spur gear is provided at the distal end of the shaft 7.

The first drive gear 6 and the second drive gear 8 provided on the shafts 5, 7 of the respective motors are arranged in a state in which the first drive gear 6 and the second drive gear 8 are projected from the joining surface 111a of the first housing 2.

The first housing 2 is provided with two mating holes 9 opening at the joining surface 111a. Inner surfaces (cylindrical inner surfaces) 9a of the mating holes 9 have inner diameters allowing outer rings of the bearings 4 to be mated therewith, and outer circumferential surfaces (cylindrical outer surfaces) 4a of the bearings 4 supporting the first drive gear 6 and the second drive gear 8 are mated with the inner surfaces 9a.

The bearing 4 that rotatably supports the first drive gear 6 is mated with the inner surface 9a of the mating hole 9, with the outer circumferential surface 4a thereof being partially projected from the joining surface 111a.

The second wrist element 112 is rotatably attached to the second housing 3, and the third wrist element 113 is rotatably attached to the second wrist element 112.

The second housing 3 is provided with a first driven gear (second gear) 10 that is engaged with the first drive gear 6 and a second driven gear (second gear) 11 that is engaged with the second drive gear 8 when the second housing 3 is combined with the first housing 2 by bringing the joining surfaces 111a into close contact with each other, said driven gears being attached to the second housing 3 so as to be rotatable, by means of bearings 12, about axes F, G parallel to each other. The individual driven gears 10, 11 respectively input, to a deceleration mechanism (not shown), the motor motive power input from the individual drive gears 6, 8, thereby driving the second wrist element 112 and the third wrist element 113.

Figure 3:
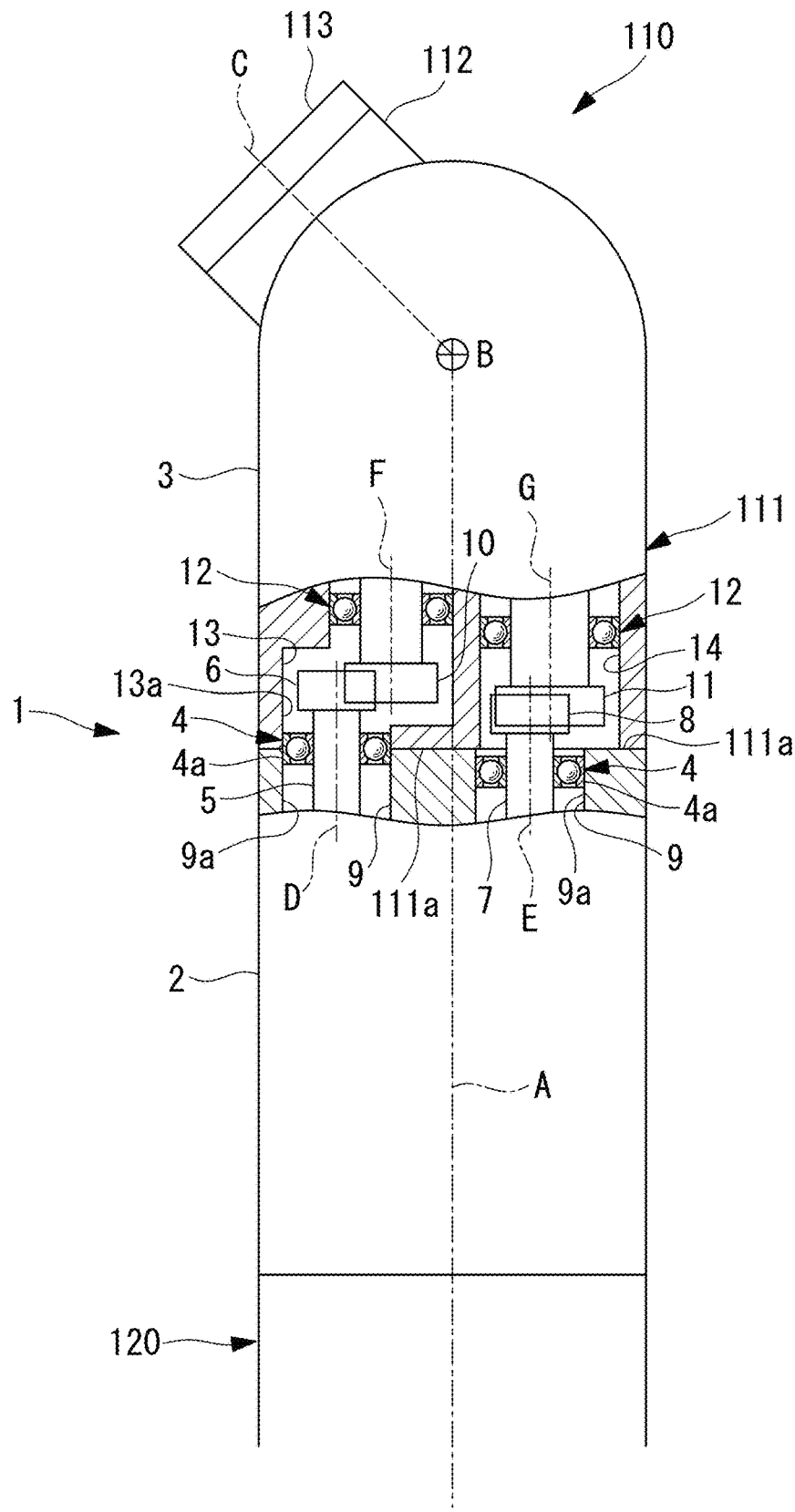
FIG. 3 is a partial longitudinal sectional view showing a state in which the components of the gear mechanism in FIG. 2 are combined.

The second housing 3 is provided with a mating hole 13 opening at the joining surface 111*a*, said mating hole being centered on the first axis D and having the same diameter as the mating hole 9 in the first housing 2 when the second housing 3 is combined with the first housing 2. With this configuration, as shown in FIG. 3, when the first housing 2 and the second housing 3 are combined so that the joining surfaces 111*a* are brought into close contact with each other, the outer circumferential surface 4*a* of the bearing 4 projecting from the joining surface 111*a* of the first housing 2 is also mated with an inner surface (cylindrical inner surface) 13*a* of the mating hole 13 in the second housing 3.

In other words, the outer circumferential surface 4*a* of the bearing 4 that supports the first drive gear 6 so as to be rotatable about the first axis D is simultaneously mated with the inner surfaces 9*a* of the mating holes 9 provided in the first housing 2 and the inner surfaces 13*a* of the mating holes 13 provided in the second housing 3, whereby the first housing 2 and the second housing 3 are combined so as to be relatively rotatable about the first axis D.

Figure 4:
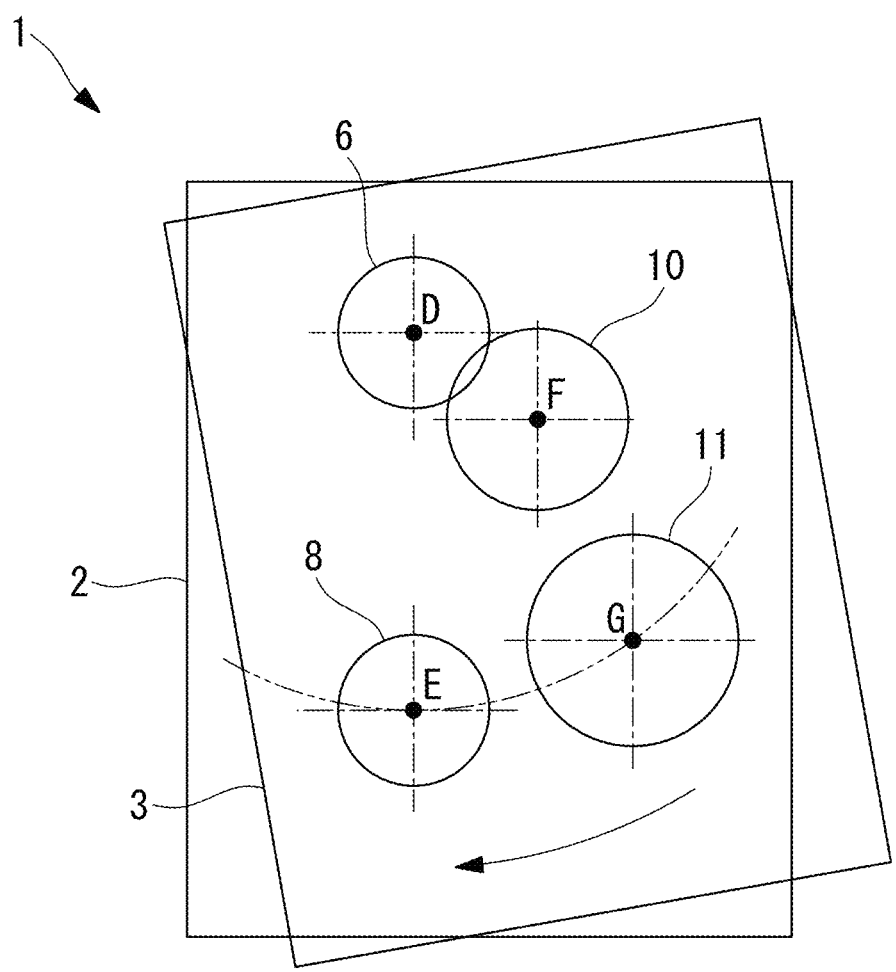
FIG. 4 is a schematic diagram showing a state in which a first drive gear and a first driven gear in FIG. 2 are engaged with each other.
Figure 5:
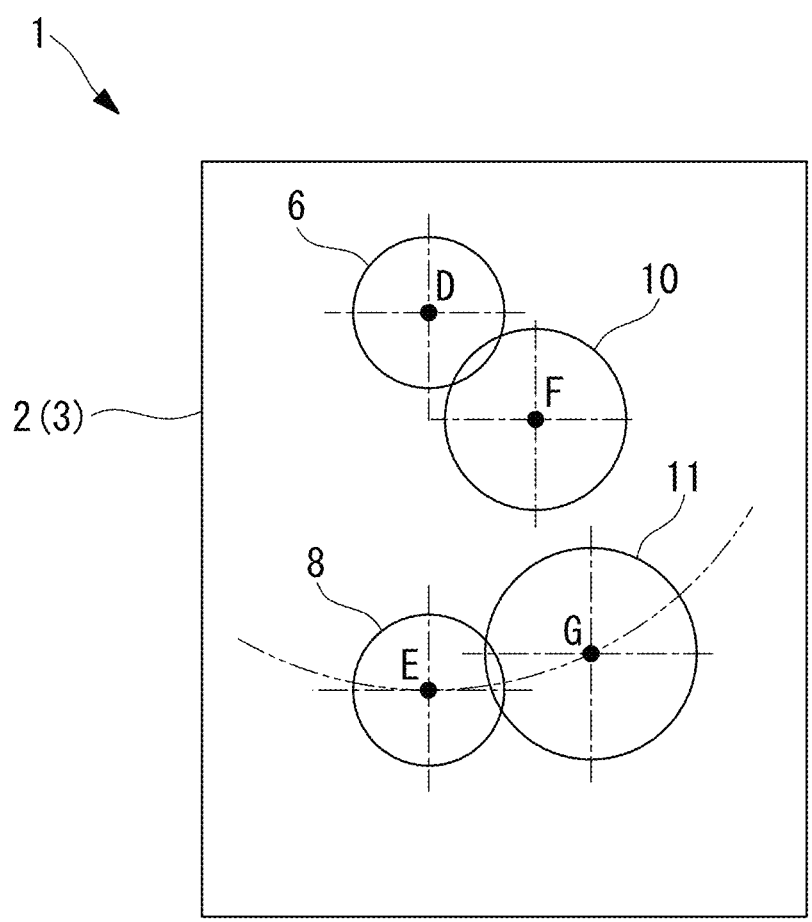
FIG. 5 is a schematic diagram showing a state in which a second drive gear and a second driven gear are engaged with each other by relatively rotating a first housing and a second housing in FIG. 3.

As shown in FIGS. 4 and 5, the second drive gear 8 and the second driven gear 11 are arranged in a positional relationship in which the inter-axial distance changes when the first housing 2 and the second housing 3 are relatively rotated about the first axis D. In this case, the second housing 3 is provided with a mating hole 14 opening at the joining surface 111*a* and having a diameter larger than that of the mating hole 13 on one side.

The first drive gear 6 and the first driven gear 10 are configured to achieve proper backlash when the first housing 2 and the second housing 3 are combined in a precisely positioned state.

The gear mechanism 1 according to this embodiment includes the first housing 2, the second housing 3, the first drive gear 6, the second drive gear 8, the first driven gear 10, and the second driven gear 11.

The gear adjustment method using the thus-configured gear mechanism 1 according to this embodiment will be described below.

In the gear adjustment method according to this embodiment, firstly, as shown in FIG. 3, the bearing 4 that is partially mated with the mating hole 9 provided in the first housing 2 is also partially mated with the mating hole 13 provided in the second housing 3, and the joining surface 111*a* of the first housing 2 and the joining surface 111*a* of the second housing 3 are brought close to each other to a position where the joining surfaces 111*a* come into close contact with each other.

By doing so, the first housing 2 and the second housing 3 are combined in a precisely positioned state, with the bearing 4 serving as an alternative to a pin. Therefore, in this state, the first drive gear 6 and the first driven gear 10 are engaged with each other so as to achieve proper backlash, as shown in FIG. 4.

Next, as indicated by an arrow in FIG. 4, the first housing 2 and the second housing 3 are relatively rotated about the first axis D. By doing so, the inter-axial distance between the second drive gear 8 and the second driven gear 11 changes; thus, as shown in FIG. 5, the first housing 2 and the second housing 3 are relatively rotated until a proper inter-axial distance is achieved. Then, by fixing the first housing 2 and the second housing 3 by fastening with the bolts at the position after the rotation, the second drive gear 8 and the second driven gear 11 are adjusted so as to achieve proper backlash.

As described above, with the gear mechanism 1, the gear adjustment method and the robot according to this embodiment, it is possible to precisely position the first housing 2 supporting the two drive gears 6, 8 and the second housing 3 supporting the two driven gears 10, 11, by using the bearing 4 as an alternative to a pin. Therefore, there is an advantage in that the first drive gear 6 and the first driven gear 10 can be properly engaged with each other, while the number of parts and the processing man-hours can be reduced by eliminating the need for a pin.

Merely by relatively rotating the first housing 2 and the second housing 3 about the first axis D, it is possible to properly adjust the engagement between the second drive gear 8 and the second driven gear 11 while maintaining the proper engagement state between the first drive gear 6 and the first driven gear 10. Because the engagement state between the first drive gear 6 and the first driven gear 10 does not change during adjustment of the engagement between the second drive gear 8 and the second driven gear 11, there is an advantage in that it is possible to easily perform the adjustment work.

Figure 6:
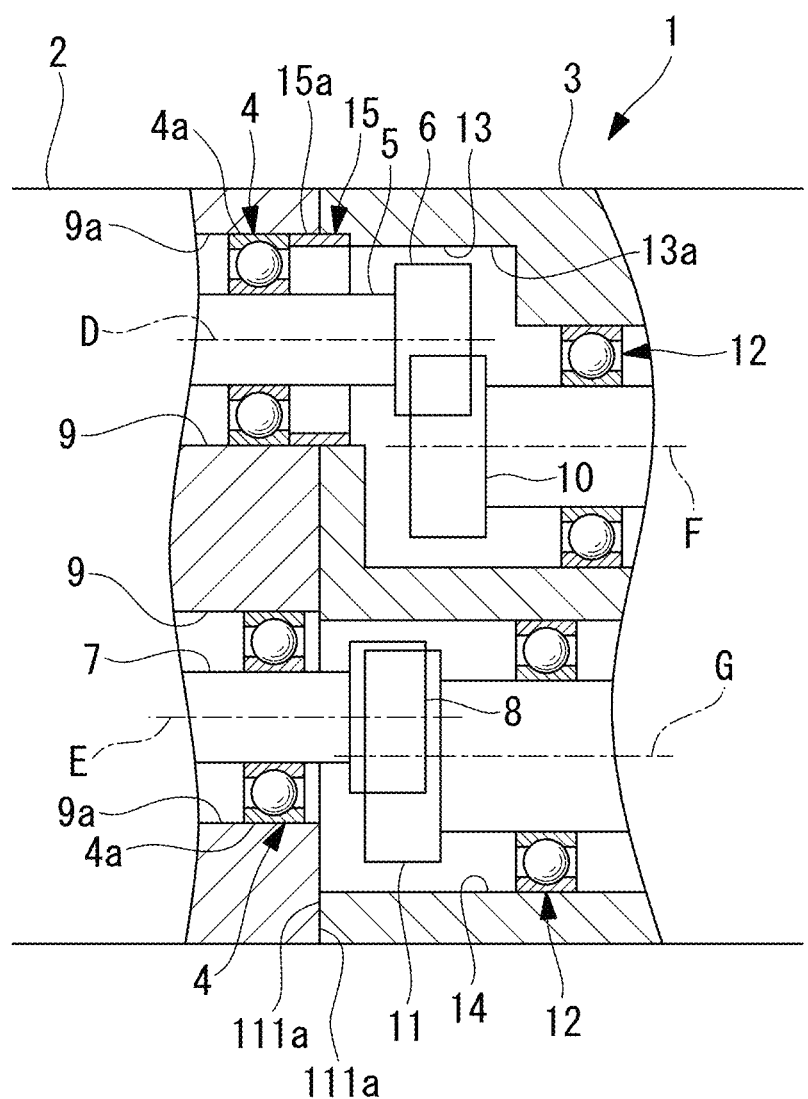
FIG. 6 is a longitudinal sectional view showing a modification of the gear mechanism in FIG. 2.

Although the outer circumferential surface 4*a* of the bearing 4 that rotatably supports the first drive gear 6 is simultaneously mated with the inner surfaces 9*a*, 13*a* of the mating holes 9, 13 provided in the first housing 2 and the second housing 3 in this embodiment, alternatively, as shown in FIG. 6, a cylindrical spacer (annular member) 15 that positions the bearing 4 in a direction along the first axis D may be disposed at a position adjacent to the bearing 4 in the direction along the first axis D, and an outer circumferential surface (cylindrical outer surface) 15*a* of the spacer 15 may be simultaneously mated with the inner surfaces 9*a*, 13*a* of the mating holes 9, 13 in the first housing 2 and the second housing 3.

By doing so, in the same manner as with the bearing 4, it is possible to relatively rotate the first housing 2 and the second housing 3 about the first axis D by using the spacer 15 instead of a pin. By setting the outer diameter of the spacer 15 to be the same as the outer diameter of the bearing 4, a step need not be formed on the inner surface 9*a* of the mating hole 9, and it is possible to precisely process the inner surface 9*a*. By having the same diameter as the bearing 4, the spacer 15 can be used in place of a c-ring or the like for preventing displacement of the bearing 4.

Here, the outer diameter of the spacer 15 may be different from the outer diameter of the bearing 4. In other words, the outer diameter of the spacer 15 may be larger or smaller than the outer diameter of the bearing 4.

In the case in which the spacer 15 is used, the bearing 4 that rotatably supports the first drive gear 6 need not be provided.

Figure 7:
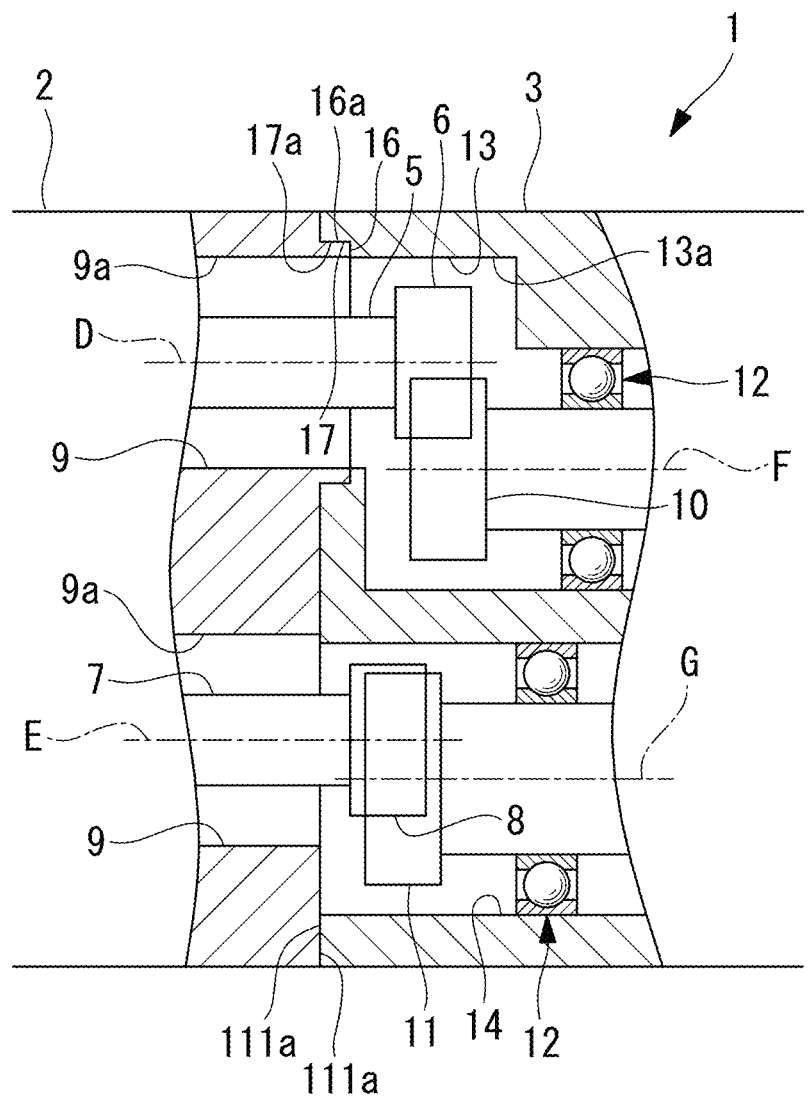
FIG. 7 is a longitudinal sectional view showing another modification of the gear mechanism in FIG. 2.

As shown in FIG. 7, a cylindrical protrusion 16 centered on the first axis D may be provided in the first housing 2, and an outer circumferential surface (cylindrical outer surface) 16*a* of the protrusion 16 may be mated with a cylindrical inner surface 17*a* of a mating hole 17 provided in the second housing 3. In this case also, the bearing 4 that rotatably supports the first drive gear 6 may or may not be provided. The protrusion 16 may be provided in the second housing 3, and the mating hole 17 may be provided in the first housing 2.

Although the two bearings 4 having the same specifications have been illustrated as an example in this embodiment, alternatively, bearings having different specifications, such as shapes, may be employed. Similarly, bearings 12 having different specifications may be employed.

The following aspect can be derived from the present invention.

An aspect of the present invention is a gear mechanism including: a pair of housings that are combined in a positioned state by mating a cylindrical inner surface and a cylindrical outer surface centered on a first axis with each other; two first gears that are attached to one of the housings so as to be rotatable about the first axis and a second axis parallel to the first axis; and two second gears that are rotatably attached to the other housing, and that are respectively engaged with the two first gears in a state in which the pair of housings are combined, wherein the first gear that is attached so as to be rotatable about the second axis and the second gear that is engaged with said first gear are arranged at positions where an inter-axial distance therebetween is changed by means of a relative rotation of the housings about the first axis.

With this aspect, the pair of housings are combined in a precisely positioned state by mating the cylindrical inner surface and the cylindrical outer surface centered on the first axis with each other. By doing so, the first gear that is attached to one of the housings so as to be rotatable about the first axis can be properly engaged with the second gear that is rotatably attached to the other housing.

By relatively rotating the pair of housings about the first axis in this state, it is possible to change the inter-axial distance between the first gear that is attached so as to be rotatable about the second axis parallel to the first axis and the second gear that is engaged therewith, while maintaining the proper engagement state between the first gear rotating about the first axis and the second gear. Therefore, it is possible to properly adjust backlash by adjusting the inter-axial distance between the first gear and the second gear so as to achieve proper engagement.

In the abovementioned aspect, the cylindrical inner surface may be provided in both of the housings, and the cylindrical outer surface may be provided in an annular member that is simultaneously mated with the cylindrical inner surfaces in both of the housings.

With this configuration, it is possible to combine the two housings so as to be rotatable about the first axis by simultaneously mating the cylindrical outer surface provided in the shared annular member with the cylindrical inner surfaces provided in both of the housings.

The invention claimed is:

1. A gear mechanism comprising:
   a pair of housings that are combined in a positioned state by mating a cylindrical inner surface and a cylindrical outer surface centered on a first axis with each other;
   two first gears that are attached to one of the housings so as to be rotatable about the first axis and a second axis parallel to the first axis; and
   two second gears that are rotatably attached to the other housing, and that are respectively engaged with the two first gears in a state in which the pair of housings are combined,
   wherein the first gear that is attached so as to be rotatable about the second axis and the second gear that is engaged with said first gear are arranged at positions where an inter-axial distance therebetween is changed by means of a relative rotation of the housings about the first axis.

2. A gear mechanism according to claim 1, wherein:
   the cylindrical inner surface is provided in both of the housings; and
   the cylindrical outer surface is provided in an annular member that is simultaneously mated with the cylindrical inner surfaces in both of the housings.

3. A gear mechanism according to claim 2, wherein the annular member is a bearing that supports, in the housing thereof, the first gear so as to be rotatable about the first axis.

4. A gear mechanism according to claim 2, wherein the annular member is a spacer that is disposed adjacent to, in a direction along the first axis, a bearing that supports, in the housing thereof, the first gear so as to be rotatable about the first axis.

5. A gear mechanism according to claim 4, wherein the cylindrical inner surface has an inner diameter that allows an outer ring of the bearing to be mated therewith.

6. A gear mechanism according to claim 1, wherein:
   the cylindrical inner surface is provided in one of the housings; and
   the cylindrical outer surface is provided in a protrusion provided in the other housing.

7. A gear adjustment method comprising:
   attaching two first gears to a first housing so as to be rotatable about a first axis and a second axis parallel to each other;
   rotatably attaching, to a second housing, two second gears that are respectively engaged with the two first gears; and
   adjusting an inter-axial distance between the first gear that is rotatable about the second axis and the second gear that is engaged with said first gear by rotating the first housing and the second housing about the first axis.

8. A robot provided with a gear mechanism according to claim 1.

* * * * *